United States Patent [19]

Stewart et al.

[11] 4,108,294

[45] Aug. 22, 1978

[54] ROTARY FLUID COUPLINGS

[75] Inventors: John Stewart; Roger Charles Stevens, both of Twickenham, England

[73] Assignee: Twiflex Couplings Limited, England

[21] Appl. No.: 662,826

[22] Filed: Mar. 1, 1976

[51] Int. Cl.² .................. F16D 25/00; E03B 1/00
[52] U.S. Cl. .................. 192/85 R; 137/580; 285/190
[58] Field of Search .............. 137/580; 192/85 R; 285/100, 101, 103, 190, 9 R

[56] References Cited

U.S. PATENT DOCUMENTS

| 2,230,881 | 2/1941 | Browne | 285/190 X |
|---|---|---|---|
| 3,036,846 | 5/1962 | Peras | 192/85 R X |
| 3,598,147 | 8/1971 | Kosaka | 192/85 R X |
| 3,880,266 | 4/1975 | Sugahara | 192/85 R X |
| 3,923,133 | 12/1975 | Chivari | 192/85 R X |

FOREIGN PATENT DOCUMENTS 2,033,170 1/1972 Fed. Rep. of Germany .......... 137/580

*Primary Examiner*—Benjamin W. Wyche
*Attorney, Agent, or Firm*—Buell, Blenko & Ziesenheim

[57] ABSTRACT

A rotary fluid coupling which is particularly suitable for connecting a stationary source of fluid pressure to a fluid-pressure operated clutch comprises inner and outer, concentric, relatively rotatable members which have a space between them constituting a generally annular chamber for receiving pressurized fluid. The chamber is sealed to prevent the leakage of fluid by a releasable sealing mechanism which is itself fluid-pressure operated. Passages extend through the two members to connect the chamber to the stationary and rotary fluid lines. Preferably, the inner member rotates relative to the outer member which may be held relatively stationary against rotation.

9 Claims, 7 Drawing Figures

ROTARY FLUID COUPLINGS

This invention relates to rotary fluid couplings and is particularly, although not exclusively, applicable to a rotary fluid coupling for connecting a stationary source of fluid (e.g. air) pressure to a fluid pressure operated clutch.

The invention provides a rotary fluid coupling for interconnecting stationary and rotary fluid lines, comprising inner and outer, concentric, relatively rotatably members having a space therebetween for receiving fluid, releasable sealing means between the members for preventing leakage of fluid from the space, means responsive to fluid pressure to engage the sealing means, and passages extending through the members from the space for connection to the stationary and rotary fluid lines.

Preferably a bearing is provided between the inner and outer members to permit said relative rotation.

Preferably, the inner member is rotatably relative to the outer member which is relatively stationary. In this case, the coupling preferably includes means for holding the outer member stationary against rotation and means for securing the inner member to a rotary body for rotation therewith with respect to the outer member.

The inner member may include oppositely facing, spaced annular abutment surfaces around its outer periphery, the outer member encircling the inner member between the abutment surfaces to define said space, and the sealing means being located between the abutment surfaces and the outer member. The outer member may be axially expandable to engage the sealing means between the ends of the outer member and the abutment faces and a fluid pressure operated means may be provided for expanding the member to engage the sealing means.

The outer member may comprise two co-axial annular members, of which one includes an annular recess in one end thereof which is adjacent the other annular member, there being an axially movable annular piston located within said recess, and a passage in said one annular member leading to the recess for the supply of pressurised fluid thereto behind the piston, the piston being disposed to move axially outwardly of the recess into engagement with the other annular member to move the two annular members apart when pressurised fluid is supplied to the recess.

Spring means may be provided for retracting the expanded outer member by drawing the two annular members together in order to release the sealing means.

The space between the inner and outer members and the recess from which the piston operates may be arranged for connection to a common source of fluid pressure.

Alternatively, the outer member may comprise two co-axial annular members which are disposed one within the other and movable axially with respect to each other, means for supplying fluid under pressure between the annular members so as to urge the annular members apart to engage the sealing means, and further sealing means between the annular members for preventing leakage of fluid therebetween.

In the latter case, the space between the inner and outer members and the means for supplying fluid under pressure between the annular members may be arranged for connection to a common source of fluid pressure.

Spring means may be provided for retracting the expanded outer member by drawing the two annular members together in order to release the sealing means. The spring means may include means for compensating automatically for wear of the sealing means between the outer member and the abutment surfaces.

According to another aspect of the invention, there is provided a rotary fluid coupling as described above in which the inner member rotates with respect to the relatively stationary outer member, in combination with a clutch mechanism which includes a rotary fluid pressure operated clutch member to which one inner member of the coupling is connected for coaxial rotation therewith.

Reference will now be made to the accompanying drawings which illustrate by way of example, various embodiments of the invention and in which.

In all the drawings, it should be noted that like parts carry the same reference numerals.

Figure 1:
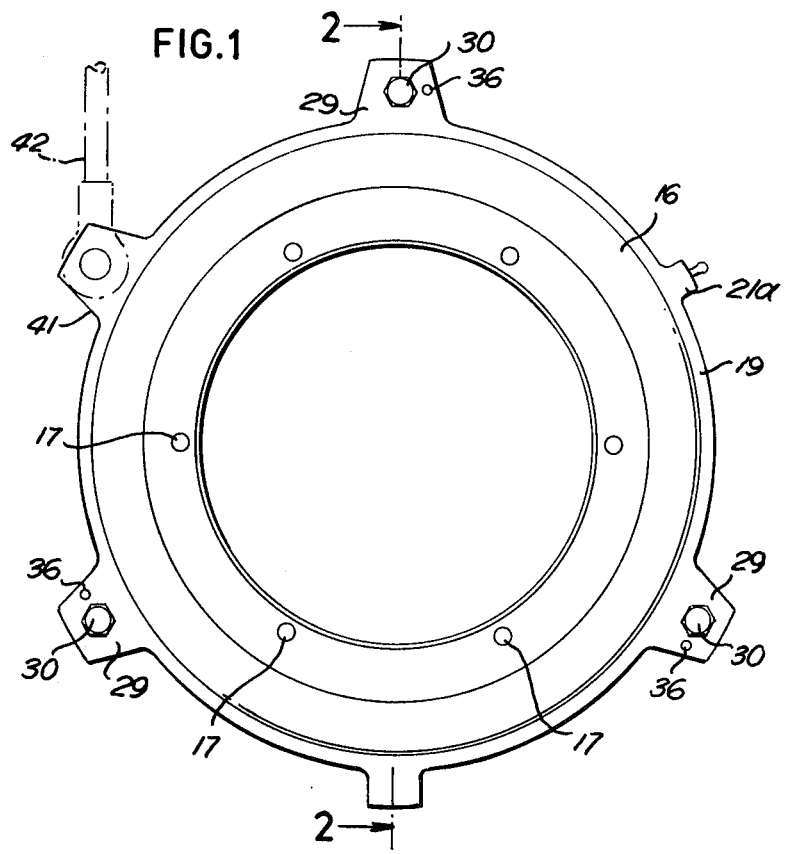
FIG. 1 is an end view of a rotary fluid coupling and part of a clutch assembly to which the coupling is attached.
Figure 2:
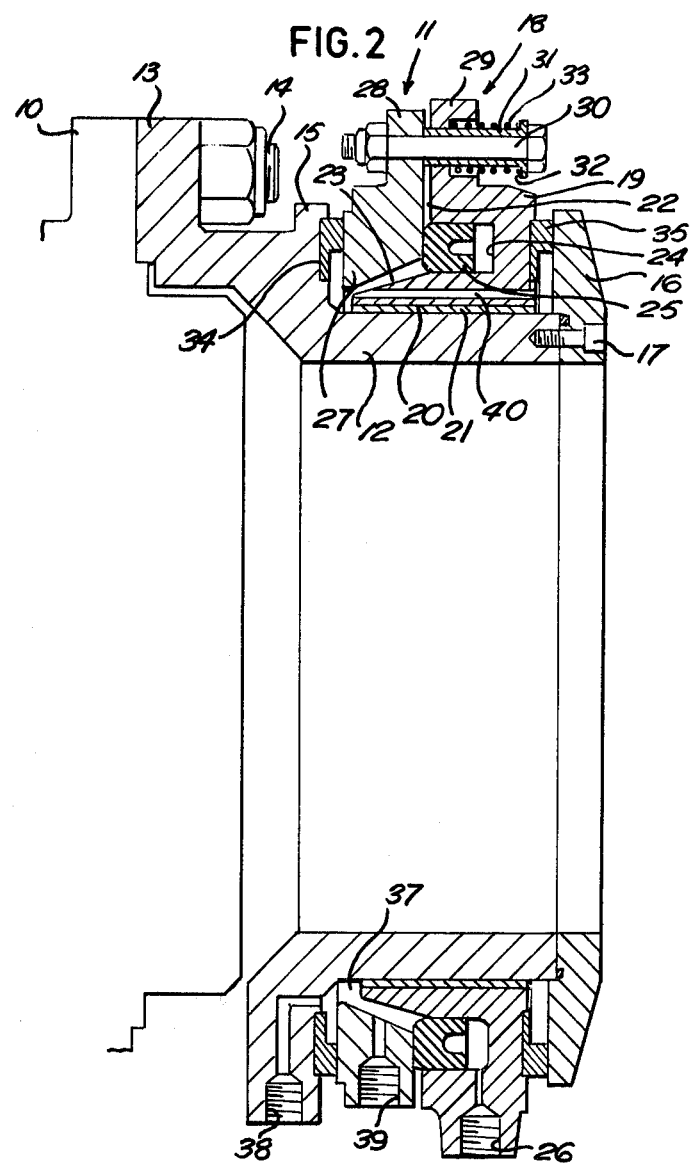
FIG. 2 is an axial section on the line 2—2 on FIG. 1.

Referring to FIGS. 1 and 2, a heavy duty clutch assembly of which a part is indicated at 10 in FIG. 2, intended for use in a ship transmission, has a pneumatically operated mechanism triggered by an air pressure pulse in known manner. A rotary coupling for connecting the rotating air operated mechanism of the clutch to a stationary air pressure supply is indicated at 11. The coupling comprises an inner annular hub 12, around which an outer annulus 18 is concentrically disposed. The hub 12 and annulus 18 are relatively rotatable, i.e. one is stationary, whilst the other rotates relative thereto about their common axis. In this embodiment, it is convenient that the hub 12 is rotatable, whilst the annulus 18 is relatively stationary. Therefore one end of the hub 12 is formed with radially outwardly projecting circumferentially spaced lugs 13 which are secured by bolts 14 to the clutch mechanism with the hub coaxial with the clutch mechanism. Adjacent the same end of the hub 12, the hub is formed with an annular encircling abutment 15 facing axially towards the other end of the hub. An encircling flange 16 is secured to the other end of the hub, opposite the abutment 15, by set screws 17.

The stationary outer annulus 18 encircles the hub 12 between the abutment 15 and the flange 16. The outer annulus 18 comprises a main annular body member 19 having an inner bore 20 in which a plane bearing 21 is located to support the body member 19 for rotation with respect to the hub 12. The side of the body member 19 adjacent the abutment 15 has a radially extending face 22 and a frusto-conical face 23 leading from the inner periphery of the radial face 22 to the inner edge of the body member. An annular recess 24 is formed around the inner periphery of the face 22 and faces towards the abutment 15. An annular piston 25 is housed in the recess 24 and an inlet passage 26 extends from the outer periphery of the body member 19 to the recess 24 to supply air under pressure to the back of the piston as described later.

An annular thrust ring 27 comprising part of the non-rotating outer annulus 18 encircles and is spaced from the frusto-conical surface 23 and bears against the projecting side of the piston 25. The thrust ring 27 is formed around its outer periphery with a plurality of spaced radial lugs 28 and the outer periphery of the body member 19 is formed with a similar number of spaced radially projecting lugs 29 which lie opposite the lugs 28. Bolts 30 passing through lugs 29 are secured to the lugs 28, the head of each bolt being spaced from the respective lug 28 by a bush 31 which is slidably supported in a bore in the respective lug 29, so that the thrust ring 27 is supported on the body member 19. A respective compression spring 32 acts between an out turned flange 33 on each bush 31 adjacent the head of the bolt 30 and the lug 29, in order to draw the thrust ring 27 towards the body member 19 and into engagement with the aforementioned piston 25.

A sealing ring 34 which also acts as a thrust bearing, is mounted on the abutment 15 opposite the thrust ring 27 which bears on the seal. A similar sealing ring 35, acting as an opposed thrust bearing, is mounted on the side of the body member 19 adjacent to the flange 16 and bears on the flange. Air pressure in the recess 24 forces the piston 25 outwardly of the recess which in turn urges the thrust ring 27 away from the body member 19 to form seals between the sealing ring 34 and thrust ring 27 and between sealing ring 35 and flange 16. The space between the annulus 18 and hub 12 is then effectively sealed off. When the air pressure is released, the springs 32 act to draw the thrust ring 27 towards the body member 19 releasing the seal. An adjustable grub screw 36 (see FIG. 1) is provided on each lug 29 and projects from the lug on the side adjacent the thrust ring to limit the movement of the thrust ring towards the annular body member 19. The grub screws are adjusted so that when the air pressure is released, the faces of the elements engaging the seals are withdrawn a small but finite distance away from the seals to avoid friction wear and heat generation at the sealing faces.

The seals enclose a space indicated generally at 37 between the hub 12 and annulus 18. A passage 38 extends through the rotatable hub 12 to the space 37 and a second passage 39 extends through the stationary thrust ring 27 to the space 37. The passage 38 is connected to the pneumatically operated mechanism for engaging the aforesaid clutch and the passage 39 is connected to an air pressure source for providing a pulse of air to engage the clutch.

In order to prevent lubricant supplied to the bearing 21 via a grease nipple 21a (FIG. 1) from being blown out of the bearing 21 by the air pressure supplied to the space 37, axial passages 40 (of which only one is visible) are formed through the annular body member 19 parallel to the bearing. The passages 40 also equalise air pressure on either side of the annulus so that no axial thrust is imposed on the hub 12.

The main annular body member 19 is formed with a further outwardly projecting lug 41 (FIG. 1) to which a reaction link 42 is attached to prevent the outer annulus from rotating with the hub.

The fluid coupling described above thus provides a connection between a stationary source of fluid pressure and a rotating mechanism to receive that fluid pressure. Since the seals between the stationary and rotating elements of the coupling can be released when no air pressure is to be transmitted, wear of the seals is reduced. A shaft can extend through the hub 12 and so the coupling can be mounted at any convenient location along a shaft as well as at either end of the shaft. The force applied to the sealing faces can be adjusted by varying the air pressure applied to the piston independently of the air pressure passing through the coupling so that the most favourable balance between seal leakage and friction torque due to the seals can be obtained. When the seals are released, the frictional torque of the coupling is very small.

No additional thrust bearings are required to counteract the sealing force and there is thus no net axial thrust upon the shaft or clutch mechanism to which the device is attached. Furthermore the two sealing rings between the rotating and non-rotating elements are physically identical and resist the same pressure differential and the force exerted upon the sealing faces is also the same. As a result, the balance between leakage and friction torque is the same on both sealing rings, preventing an excessive heat generation at one sealing ring coupled with high leakage at the other.

Figure 3:
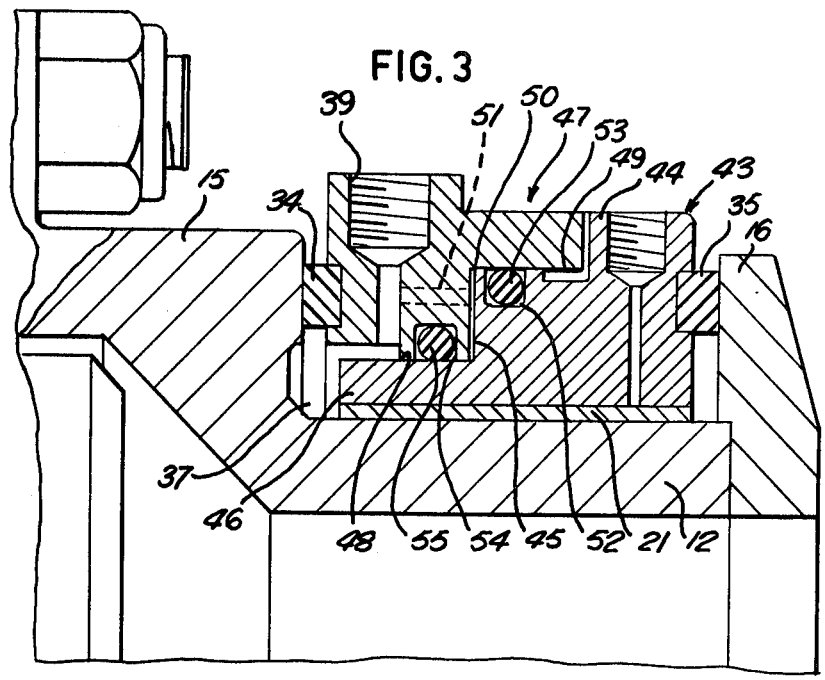
FIG. 3 is an axial section of part of a further embodiment of a rotary fluid coupling and part of a clutch assembly to which the coupling is attached.
Figure 4:
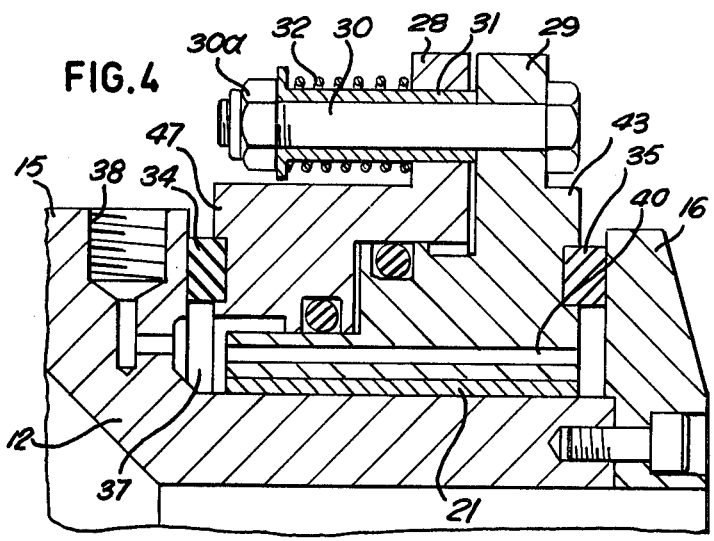
FIG. 4 is an axial section of a further part of the rotary fluid coupling of FIG. 3.

FIG. 3 and FIG. 4 show an alternative embodiment of the rotary fluid coupling of FIGS. 1 and 2 wherein the rotary piston 25 and the annular recess 24 are omitted. Body member 43 of the outer non-rotating member includes a main cylindrical spigot portion 44, an axially facing step 45 and a reduced diameter cylindrical spigot portion 46. An annular thrust ring 47 has a bore 48 which receives the reduced spigot portion 46, and a counter bore 49 which receives the main spigot portion 44, the bottom 50 of the counter bore 49 facing the step 45.

The annular thrust ring 47 has an radial passage 39 communicating with a space 37 as in the previous embodiment, the passage 39 having a branch passage 51 communicating with the bottom 50 of the counter bore 49.

The main spigot portion 44 of the body member 43 has an annular groove 52 formed in its outer surface. The annular groove 52 accommodates a sealing ring 53, which provides a seal between the outer face of the main spigot portion 44 and the surface of the counter bore 49. Similarly an annular groove 54 is formed in the surface of the bore 48 to receive sealing ring 55, which provides a seal between the outer face of the reduced spigot portion 46 and the surface face of bore 48. The sealing rings 53 and 55 thus provide seals on either side of the step 45.

When air is supplied under pressure to passage 39 the body member 43 and annular thrust ring 47 are urged apart, by the air pressure being communicated by branch passage 51 to and acting on the bottom 50 of the bore 49 and the step 45, to form respective seals between the sealing ring 34 and thrust ring 47 and between sealing ring 35 and flange 16.

As in the previous embodiment springs 32 are provided to draw the thrust ring 47 towards the body member 43 thereby releasing the seal when the air pressure in passage 39 is cut off. In this embodiment, however, the sleeves 31 are disposed on the bolts 30 so that their out-turned flanges are adjacent the retaining nuts 30a rather than the bolt heads, so that the spring 32 act between the flanges on the sleeves and the respective lugs on the thrust ring 47 rather than the lugs on the body member as in the previous embodiment.

Figure 7:
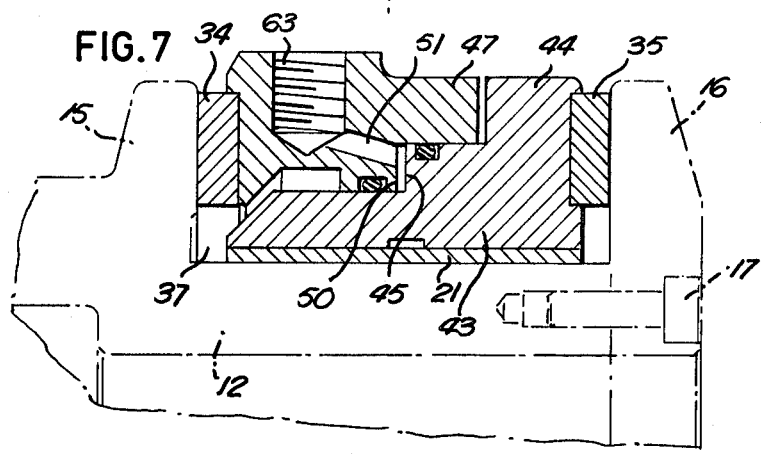
FIG. 7 is an enlarged part section on the line 7—7 in FIG. 5.
Figure 5:
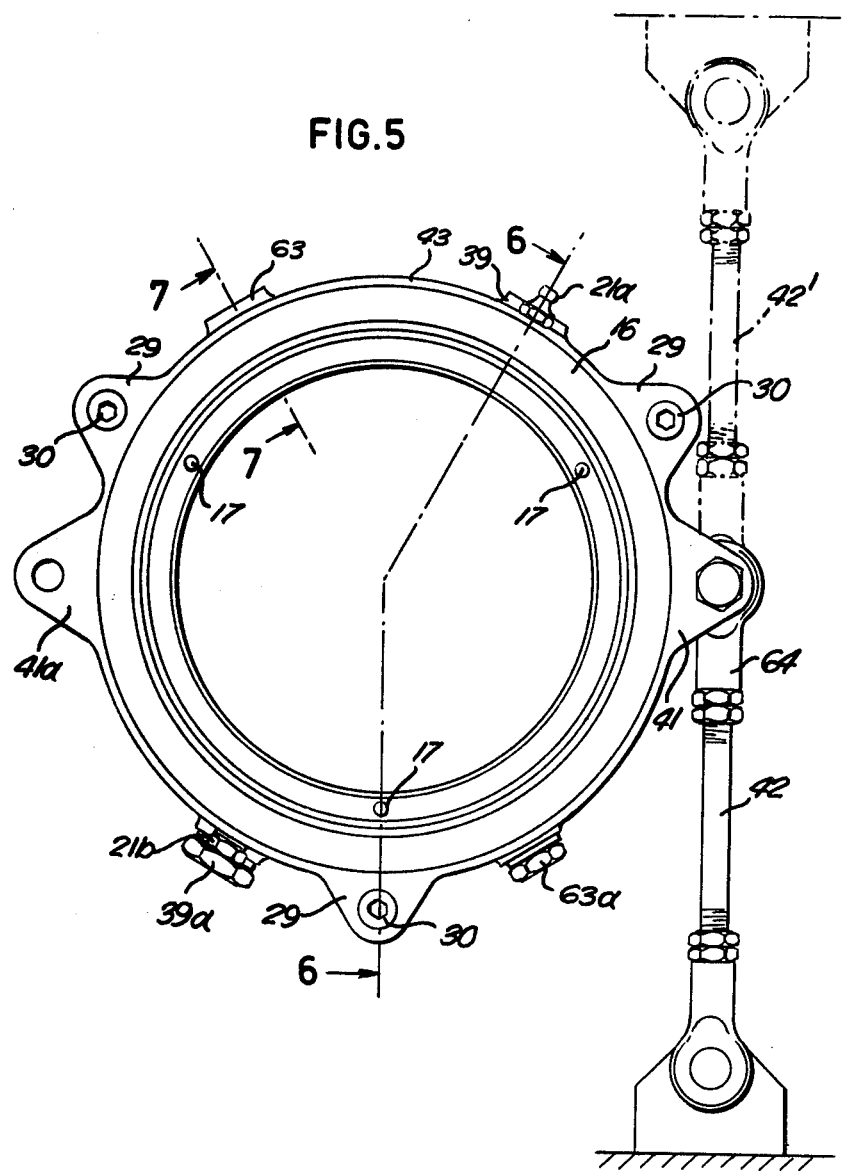
FIG. 5 is an end view of a part of a third embodiment of a rotary fluid coupling for attachment to a part of a clutch assembly.
Figure 6:
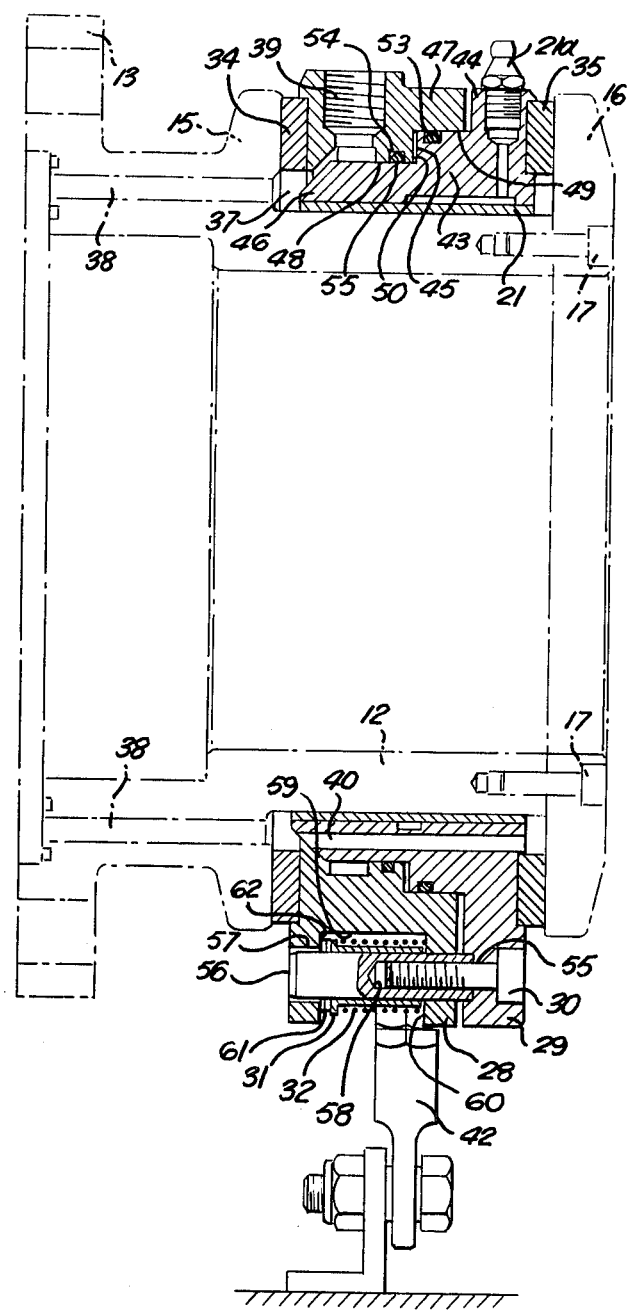
FIG. 6 is an enlarged axial section on the line 6—6 in FIG. 5.

FIGS. 5, 6 and 7 show a modified embodiment of the rotary fluid coupling of FIGS. 3 and 4.

The body member 43 is provided with three circumferentially spaced lugs 29, which are connected to corresponding lugs 28 on the thrust ring 47 by bolts 30 so that, as in the previously described embodiments, the thrust ring and body member are relatively movable in an axial direction to engage the sealing rings 34 and 35. In this embodiment, each bolt 30 passes through a countersunk bore 55 in the respective lug 29. A respective locating pin 56 which is slidably located in a bore 57 in the respective lug 28 and which has an axial threaded bore 58, is screwed on to the threaded shank of the bolt 30. The lug 28 is provided with a recess 59 which intersects the bore 57, so that the pin 56 extends through the recess 59. A sleeve 31 encircled by a helical spring 32 surrounds the part of the pin 56 within the recess. The spring 32 being arranged to act between the out-turned flange at one end of the sleeve and one end wall 60 of the recess 59 to retract the expanded outer annulus i.e. to disengage the thrust ring 47 and body member 43 from the sealing rings 34 and 35 respectively when the fluid pressure in passage 51 is relieved as above. In order than any wear in the sealing rings 34, 35 does not affect the distance through which the outer annulus retracts, the flanged end of the sleeve 31 bears against a pair of spring rings 61 which encircle the pin 56 between the end of the sleeve 31 and the other end wall 52 of the recess 59 and which are movable in one direction only along the pin. The presence of the spring rings 61 ensures that the retraction distance remains constant and pevents excessive end float in the non-rotating part of the coupling.

In this embodiment, the passage 51 leading to the space between the confronting surfaces 45 and 50 of the body member 43 and the thrust ring 47 respectively and the passage 39 to the space 37 are not interconnected within the thrust ring, as in the embodiment illustrated in FIGS. 3 and 4. Instead the passage 51 is connected to a sealing air inlet passage 63 (FIGS. 5 and 7) which is circumferentially spaced from the passage 39. However, where the clutch operating fluid is also air, it is possible to connect passages 63 and 39 to a common pressurised air source.

the coupling is provided with an alternative main fluid inlet 39a, and an alternative sealing fluid inlet 63a, and an alternative grease nipple 21b which are normally blanked off as shown in FIG. 5, but which may be used when the normal inlets and grease nipple are inaccessible by virtue of the location of the coupling. In similar fashion, the reaction link 42 which is connected to lug 41 on the body member 43 is rotatably mounted by means of a bearing 64 so that it may occupy either the position shown in full lines in FIG. 5 or that shown in main lines, whichever is more convenient. It should be noted that the location of the link 46 on the right-hand side of the coupling as viewed in FIG. 5 is only suitable when the hub 12, which may be located at any point along a shaft, rotates in a clockwise direction. Where rotation is anticlockwise, the link 42 is connected to a second lug 41a provided on the opposite side of the coupling from lug 41.

We claim:

1. A rotary fluid coupling for interconnecting stationary and rotary fluid lines comprising a rotary shaft having two axially spaced, axially directed, annular abutment surfaces which face each other, said abutment surface being concentric with said shaft; an axially expandable outer member which encircles the shaft between said two abutment surfaces, there being provided a space for receiving fluid between the shaft and the outer member, and respective fluid passages extending within the shaft and the outer member leading to said space for respective connection to rotary and stationary fluid lines; means for preventing rotation of said outer member about the axis of the shaft; and respective releasable first annular sealing means located between each abutment surface on the shaft and an adjacent axial end surface of the outer member for preventing leakage of fluid from said space when the outer member is expanded; the outer member comprising two coaxial annular members which are disposed one within the other for axial movement with respect to each other and to the rotary shaft, each annular member having a respective axial annular end face which is disposed for sealing engagement with the respective one of said first annular sealing means when the outer member is axially expanded, a first of said annular members having an axial bore within which the shaft is rotatably disposed and an outer surface of which the diameter increases in one axial direction, the second annular member having an axial bore of which the diameter increases in correspondence with that of said outer surface of the first annular member in the same axial direction, said outer surface of the first annular member being disposed within the axial bore in the second annular member, there being provided two axially spaced second annular sealing means located within said bore in the second annular member which are sealingly engaged between said outer surface of the first annular member and the wall of the bore in the second annular member whereby a fluid actuation chamber is provided between said axially increasing surfaces and between said sealing means, and means for supplying pressurized fluid between the first and second annular members between said second annular sealing means to urge said two annular members apart thereby to expand the outer member.

2. A rotary fluid coupling for interconnecting stationary and rotary fluid lines comprising a rotary shaft having two axially spaced, axially directed, annular abutment surfaces which face each other, said abutment surfaces being concentric with said shaft; an axially expandable outer member which encircles the shaft between said two abutment surfaces, there being provided a space for receiving fluid between the shaft and the outer member, and respective fluid passages extending within the shaft and the outer member leading to said space for respective connection to rotary and stationary fluid lines; means for preventing rotation of said outer member about the axis of the shaft; and respective releasable first annular sealing means located between each abutment surface on the shaft and an adjacent axial end surface of the outer member for preventing leakage of fluid from said space when the outer member is expanded; the outer member comprising two co-axial annular members which are disposed one within the other for axial movement with respect to each other and to the rotary shaft, each annular member having a respective axial annular end face which is disposed for sealing engagement with the respective one of said first annular sealing means when the outer member is axially expanded, a first of said annular members having an axial bore within which the shaft is rotatably disposed and an outer surface which is stepped so that its diameter increases in one axial direction, the second annular member having an axial bore which is stepped in correspondence with the stepping of the outer surface of the first annular member so that the diameter of the axial bore of the second annular member increases in correspondence with that of said stepped outer surface of the first annular member in the same axial direction, said stepped outer surface of the first annular member being disposed within the stepped axial bore of the second annular member so that an axially facing annular surface of the axial bore in the second annular member faces an adjacent axially facing annular surface of the outer surface of the first annular member, there being provided two axially spaced second annular sealing means located within said axial bore in the second annular member which are sealingly engaged between said outer surface of the first annular member and the wall of the axial bore in the second annular member, said axially increasing annular surfaces on the two annular members being disposed between said second annular sealing means, and means for supplying pressurized fluid between the first and second annular members between the second annular sealing means to urge said two annular members apart thereby to expand the outer member.

3. A rotary fluid coupling as claimed in claim 2, in which the means for supplying pressurized fluid between the two annular members includes a fluid passageway in the second annular member leading to said bore in the second annular member between said second annular sealing means.

4. A rotary fluid coupling as claimed in claim 2, in which the fluid passage in the outer member leading to the space betwen the shaft and the outer member, and the means for supplying pressurized fluid between the two annular members are arranged for connection to a common source of fluid pressure.

5. A rotary fluid coupling as claimed in claim 2, in which the means for supplying pressurized fluid between said two annular members includes a fluid passageway in the second annular member which is in fluid communication with the bore in second annular member between said second annular sealing means via a port in the axially facing annular surface in the wall of said bore in the second annular member.

6. A rotary fluid coupling as claimed in claim 2, in which spring means are provided for retracting the expanded outer member when the fluid pressure between said annular members is relieved, by drawing together the annular members in order to release each of said first annular sealing means from sealing engagement between the respective abutment surface on the shaft and the adjacent axial end surface of the outer member.

7. A rotary fluid coupling as claimed in claim 6, in which said spring means includes means for compensating automatically for wear of said first annular sealing means.

8. A rotary fluid coupling as claimed in claim 1, in which a bearing is provided within the axial bore in the first annular member, which bearing encircles the shaft.

9. A rotary fluid coupling as claimed in claim 1, in combination with a clutch mechanism which includes a rotary fluid pressure operated clutch member to which the shaft of the coupling is connected for conjoint coaxial rotation, and means for operating said clutch member, said operating means including a rotary fluid line connected to the fluid passage in said shaft leading to said space between kthe shaft and the outer member.

* * * * *

UNITED STATES PATENT AND TRADEMARK OFFICE
CERTIFICATE OF CORRECTION

PATENT NO. : 4,108,294
DATED : August 22, 1978
INVENTOR(S) : John Stewart and Roger Charles Stevens It is certified that error appears in the above-identified patent and that said Letters Patent are hereby corrected as shown below:

Column 5, line 26, "than" should be --that--.

Claim 4, column 7, line 34, "betwen" should be --between--.

Claim 8, column 8, line 24, "claim 1" should read --claim 2--.

Claim 9, column 8, line 27, "claim 1" should read --claim 2--.

Claim 9, column 8, line 34, "kthe" should be --the--.

Signed and Sealed this

Nineteenth Day of June 1979

[SEAL]

Attest:

RUTH C. MASON
*Attesting Officer*

DONALD W. BANNER
*Commissioner of Patents and Trademarks*